(12) United States Patent
Hiraoka et al.

(10) Patent No.: US 8,064,657 B2
(45) Date of Patent: Nov. 22, 2011

(54) CLEANING DEVICE FOR FINGERPRINT AUTHENTICATION APPARATUS, CLEANING METHOD, AND FINGERPRINT AUTHENTICATION SYSTEM USING THE SAME

(75) Inventors: Masaharu Hiraoka, Tokyo (JP); Tsuyoshi Kokubo, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 12/396,891

(22) Filed: Mar. 3, 2009

(65) Prior Publication Data
US 2009/0226051 A1    Sep. 10, 2009

(30) Foreign Application Priority Data
Mar. 5, 2008    (JP) .................................. 2008-054609

(51) Int. Cl.
G06K 9/00    (2006.01)
(52) U.S. Cl. .................. 382/124; 382/100; 15/256.5
(58) Field of Classification Search .................. 382/100, 382/124, 325; 15/256.5
See application file for complete search history.

(56) References Cited

U.S. PATENT DOCUMENTS

| 3,677,623 | A | * | 7/1972 | Hall et al. | 359/896 |
| 4,074,217 | A | * | 2/1978 | Yanagawa | 355/30 |
| 4,701,959 | A | * | 10/1987 | Asai et al. | 382/126 |
| 6,779,383 | B2 | * | 8/2004 | Lizotte et al. | 73/61.48 |
| 6,826,000 | B2 | * | 11/2004 | Lee et al. | 359/833 |

FOREIGN PATENT DOCUMENTS

| JP | 1989116923 A | 8/1989 |
| JP | 1992088586 A | 7/1992 |
| JP | 2007025989 A | 2/2007 |
| JP | 2007034809 A | 2/2007 |
| JP | 2007196572 A | 8/2007 |
| JP | 2008146537 A | 6/2008 |
| KR | 0587885 A | 6/2006 |
| KR | 0596454 A | 7/2006 |

OTHER PUBLICATIONS

Japanese Office Action for JP2008-054609 issued Nov. 18, 2009.
Korean Office Action for KR10-2009-0018372 issued Nov. 2, 2010.

* cited by examiner

*Primary Examiner* — Stephen Koziol

(57) ABSTRACT

A cleaning device for a fingerprint authentication apparatus, include a shutter which is opened or closed in order to expose or cover a surface of a scan plate for carrying out a finger authentication by said fingerprint authentication apparatus; a cleaner which cleans said surface of said scan plate, while rotating; and a driving unit which drives said shutter to said closed state so as that said surface of said scan plate may be covered, and drives said cleaner.

9 Claims, 7 Drawing Sheets

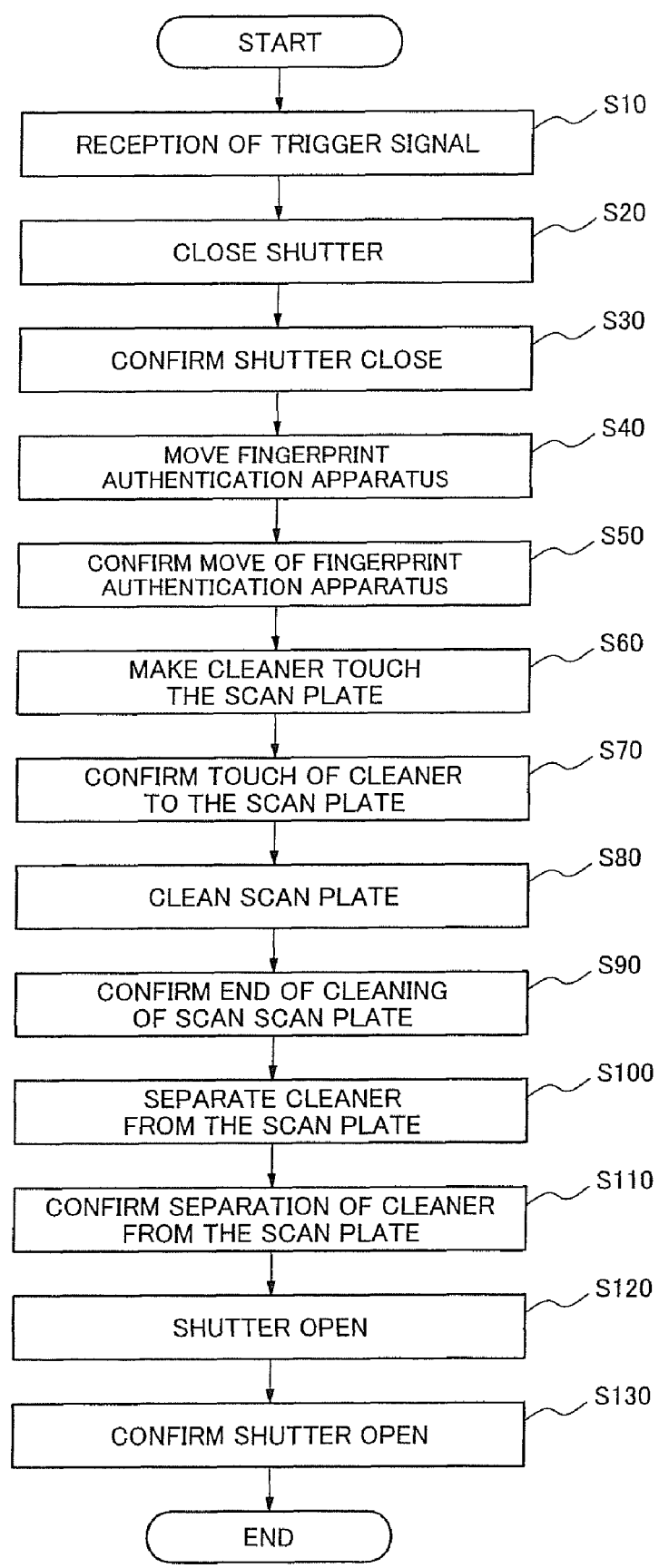

CLEANING DEVICE FOR FINGERPRINT AUTHENTICATION APPARATUS, CLEANING METHOD, AND FINGERPRINT AUTHENTICATION SYSTEM USING THE SAME

This application is based upon and claims the benefit of priority from Japanese Patent Application No. 2008-054609, filed on Mar. 5, 2008, the disclosure of which is incorporated herein in its entirety by reference.

TECHNICAL FIELD

The present invention relates to a cleaning device for a fingerprint authentication apparatus, a cleaning method and a fingerprint authentication system using these.

BACKGROUND ART

In a fingerprint authentication apparatus, light from a light source illuminates a finger touching a scan glass surface. Light reflected by this finger is captured by an image pickup device as a fingerprint image. Then, a fingerprint authentication processing is performed by collating a captured fingerprint image with a fingerprint image registered in previously. An individual is identified by this fingerprint authentication processing.

The buildup security of an information processing apparatus attracts the attention today. For this reason, an introduction of the fingerprint authentication apparatus into the information processing apparatus has been performed extensively. And the fingerprint authentication apparatus which can perform the authenticating processing with a high speed and a high accuracy is required, because the fingerprint authentication apparatus is used by large number peoples.

However, the fingerprint authentication apparatus of the related art has several problems as follows.

One problem is that authentication accuracy is low. That is, in the fingerprint authentication apparatus, dirt, sebum, or the like on a finger adheres to the scan glass surface because it makes a finger touches the scan glass surface directly. For this reason, the authentication accuracy becomes low.

Another problem is that the scan glass surface is not sanitary. That is, in the fingerprint authentication apparatus, since many people's finger touches the scan glass surface directly, the dirt or the like of other people's finger may adhere. Therefore, it is not sanitary.

In order to solve such problems, Japanese Patent Application Laid-Open No. 1992-088586 proposes a fingerprint input apparatus equipped with a light source, a light guiding means, an image pickup means and a covering means.

This light guiding means has a contact surface which a finger touches and illuminates light to the finger touching this contact surface.

The image pickup means captures reflected light from the finger. That is, because light from the light source is reflected by the finger touching the contact surface, the image pickup means captures this reflected light as the fingerprint image.

The covering means opens and closes this contact surface according to the motion of the finger which touches the contact surface or to separate the finger from the contact surface. That is, the covering means exposes the contact surface when making the finger touch the contact surface, and covers the contact surface when separating the finger from the contact surface.

Further, a cleaner is equipped on the face of the covering means facing the contact surface. The cleaner cleans the contact surface when the covering means moves according to the movement of the finger. Therefore, since adhesion of the dust and sebum to the contact surface decreases and a scratch becomes difficult to be attached to the contact surface compared with the structure which the contact surface always exposes, the authentication accuracy improves.

Patent Application Laid-Open No. 2007-196572 discloses a configuration which adopts a rack-and-pinion system to drive an ejector pin for ejecting injection-molded pieces from a fixed die. Japanese Utility Model Application Laid-Open No. Hei 1-116923 discloses a cassette cleaner of a video cartridge recorder.

Although this Japanese Patent Application Laid-Open No. 2007-196572 and Japanese Utility Model Application Laid-Open No. Hei 1-11692 are completely different from a cleaning device for a fingerprint authentication apparatus in a technical field, Japanese Patent Application Laid-Open No. 1992-088586 belongs to the same technical field as a cleaning device for a fingerprint authentication apparatus.

However, in Japanese Patent Application Laid-Open No. 1992-088586, there is a problem that enough cleaning cannot be performed, because the cleaning of the contact surface is performed according to the movement of the inserted finger when fingerprint authentication is performed.

SUMMARY

An exemplary object of the present invention is to provide a cleaning device for a fingerprint authentication apparatus, a cleaning method and a fingerprint authentication system using the same which can clean a scan plate that a finger touches at high speed and reliably and safely.

A cleaning device for a fingerprint authentication apparatus according to an exemplary aspect of the invention, include a shutter which is opened or closed in order to expose or cover a surface of a scan plate for carrying out a finger authentication by said fingerprint authentication apparatus; a cleaner which cleans said surface of said scan plate, while rotating; and a driving unit which drives said shutter to said closed state so as that said surface of said scan plate may be covered, and drives said cleaner.

A fingerprint authentication system which carries out a authenticating processing according to an exemplary aspect of the invention, include a fingerprint authentication processing unit which performs fingerprint authentication based on a fingerprint image of a finger, and includes a fingerprint authentication apparatus; a shutter which is opened or closed in order to expose or cover a surface of a scan plate which for carrying out a finger authentication by said fingerprint authentication apparatus touches; a cleaner which cleans said surface of said scan plate, while rotating; and a driving unit which drives said shutter to said closed state so as that said surface of said scan plate may be covered, and drives said cleaner.

A cleaning method for a fingerprint authentication apparatus according to an exemplary aspect of the invention, include a step for controlling a shutter to be in an exposure state of a scan surface of said fingerprint authentication apparatus which an authenticated finger touches; a step for cleaning said scan surface by a rotating a cleaner; and a step for causing said shutter to be in a closed state such that said scan surface is covered when said cleaner cleans said scan surface.

BRIEF DESCRIPTION OF THE DRAWINGS

Exemplary features and advantages of the present invention will become apparent from the following detailed description when taken with the accompanying drawings in which:

FIG. 10 is a diagram showing an example of an operation flow of the cleaning device for the fingerprint authentication apparatus.

EXEMPLARY EMBODIMENT

Exemplary embodiments of the present invention will now be described in detail in accordance with the accompanying drawings.

Figure 1:
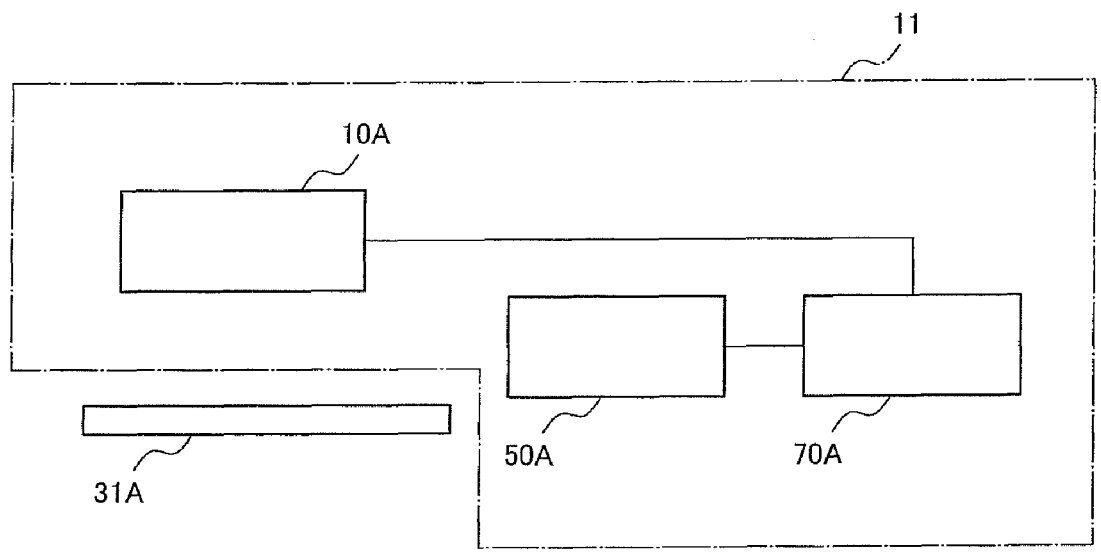
FIG. 1 is a block diagram showing a cleaning device for a fingerprint authentication apparatus according to a first exemplary embodiment of the present invention.

FIG. 1 is a block diagram showing a cleaning device for a fingerprint authentication apparatus according to a first exemplary embodiment of the present invention.

The cleaning device 11 for the fingerprint authentication apparatus includes a shutter 10A, a cleaner 50A and a driving unit 70A. By performing open-close movement, the shutter 10A exposes or covers a scan plate 31A which the finger to authenticate by the fingerprint authentication apparatus touches.

The cleaner 50A cleans the surface of the scan plate 31A while rotating. A driving unit 70A drives the shutter 10A to change it into a closed state, and drives the cleaner 50A in the state where the scan plate 31A is covered with the shutter 10A. A driving unit 70A drives the shutter 10A to change into a closed state, and drives the cleaner 50A in the state where the scan plate 31A is covered with the shutter 10A.

When the fingerprint authentication is performed, the driving unit 70A drives the shutter 10A into an opened state, and exposes the scan plate 31A.

On the other hand, when the fingerprint authentication is not performed, the driving unit 70A drives the shutter 10A into the closed state, and covered the scan plate 31A, thereby can prevent the scratch or the like of the scanning plane 31A.

Further, when the scan plate 31A is cleaned, the driving unit 70A may drive this cleaner 50A in such a way that the cleaner 50A touches the surface of the scan plate 31A to clean it, and separates from the surface of the scan plate 31A after cleaning.

At this time, the driving unit 70A drives the cleaner 50A as follows. That is, when cleaning the scan plate 31A, the cleaner 50A is touched to the surface of the scan plate 31A, and cleans. Then, when cleaning is completed, the cleaner 50A is separated from the scan plate 31A.

Thus, because the surface of the scan plate 31A is cleaned, even if a large number of people use the same apparatus, the surface of the scan plate 31A can be maintained sanitary, and decline of the authentication accuracy by dirt, sebum or the like on the finger adhering on the scan plate 31A can be prevented.

Next, a cleaning device for a fingerprint authentication apparatus according to a second exemplary embodiment of the present invention will be described.

Figure 2:
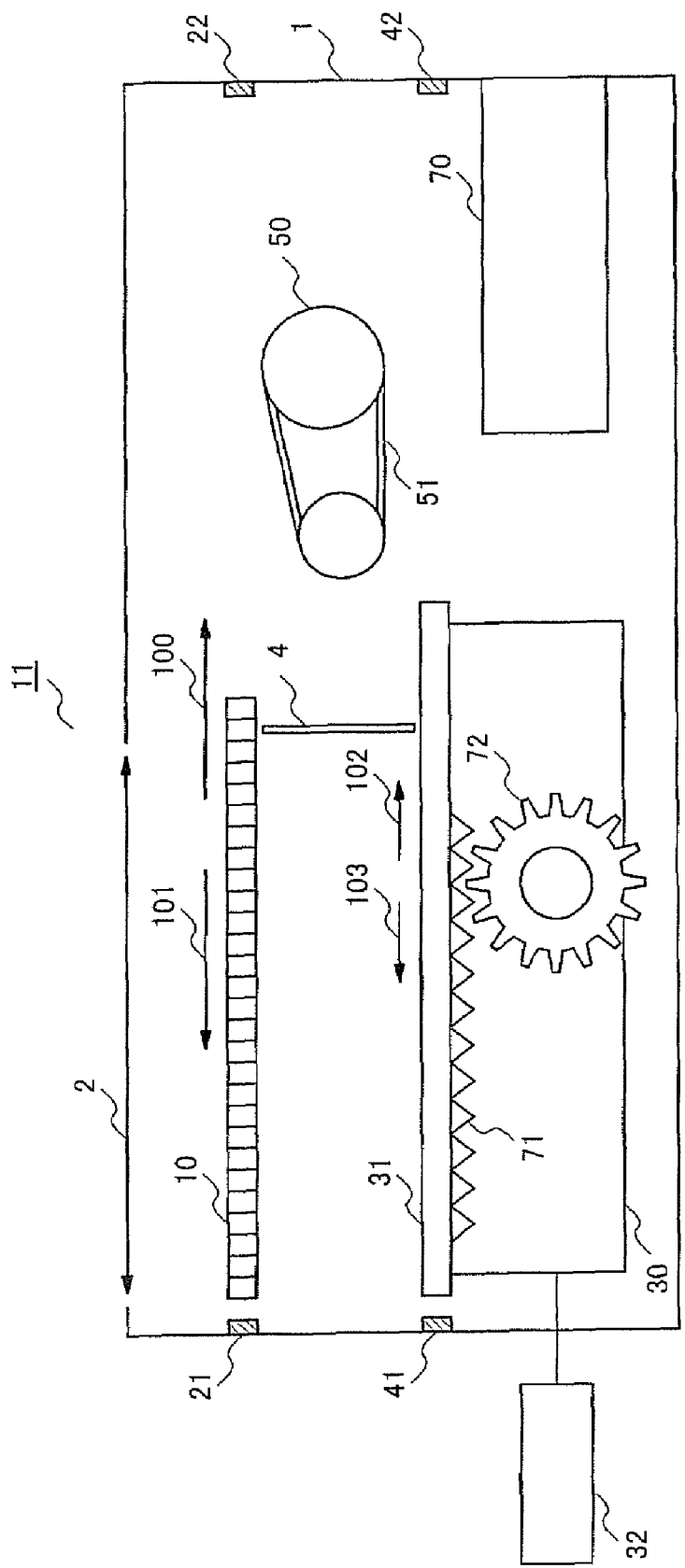
FIG. 2 is a side view of a cleaning device for a fingerprint authentication apparatus according to a second exemplary embodiment of the present invention.

FIG. 2 is a side view of the cleaning device for the fingerprint authentication apparatus according to the second exemplary embodiment. The second exemplary embodiment is an example configured as a fingerprint authentication system which includes the fingerprint authentication apparatus in addition to the function of the cleaning device of the first exemplary embodiment.

That is, the cleaning device 11 for the fingerprint authentication apparatus includes a chassis 1, a shutter 10, a fingerprint authentication apparatus 30, a cleaner 50 and a driving unit 70.

The shutter 1, the fingerprint authentication apparatus 30, the cleaner 50, the driving unit 70, and detectors 21, 22, 41 and 42 are arranged in the chassis 1. A description of these components will be made later.

Also an opening 2 is provided in the chassis 1. The opening 2 is a window for inserting a finger of a person who is performed fingerprint authentication (hereinafter, referred to as an authentication user) in the chassis 1. Further, the finger inserted from the opening 2 touches a scan plate 31 of the fingerprint authentication apparatus 30 as mentioned later.

Furthermore a partition 4 is provided in the chassis 1. The partition 4 divides a space in the chassis 1 into space of the opening 2 side and a space of the cleaner 50 side by being installed nearby and below an edge of the opening 2.

Next, the configuration of the shutter 10 will be described. The shutter 10 opens and closes the opening 2 by moving in parallel to the aperture plane of the opening 2. That is, the shutter 10 is at the position under (the underside in FIG. 1) the opening 2, and is arranged in parallel with the plane of this opening 2.

The shutter 10 is driven by the driving unit 70, and moves in parallel with the plane of the opening 2. As a result, when the shutter 10 moves to the moving direction 100 shown in FIG. 2, the opening 2 is opened, and when the shutter 10 moves to the direction of a moving direction 101 shown in FIG. 2, the opening 2 is closed.

However, the moving direction of the shutter 10 is not limited to the moving direction 100 and 101 if the opening 2 is opened and shut by movement of the shutter 10.

Figure 3:
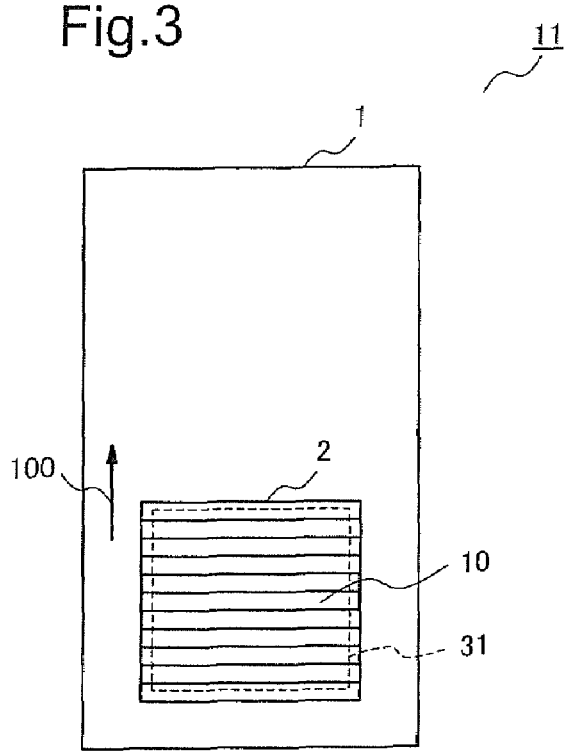
FIG. 3 is a plan view showing the closed state of an opening of the cleaning device for the fingerprint authentication apparatus.

Here, the open-close movement of the shutter 10 will be described with reference to FIG. 3 and FIG. 4. FIG. 3 is a top view of the cleaning device 11 for the fingerprint authentication apparatus in the state where the opening 2 is closed by the shutter 10.

As shown in FIG. 3, the scan plate 31 cannot be seen from outside, because the shutter 10 has closed the opening 2. That is, the scan plate 31 is covered with the shutter 10. In FIG. 3, the dotted line shows the scan plate 31. The cleaner 50 cleans the scan plate 31 at this state.

On the other hand, by the shutter 10 moving to the moving direction 100, the opening 2 is opened. FIG. 4 is a top view of the cleaning device 11 for the fingerprint authentication apparatus in the state that the opening 2 is opened by the shutter 10.

Figure 4:
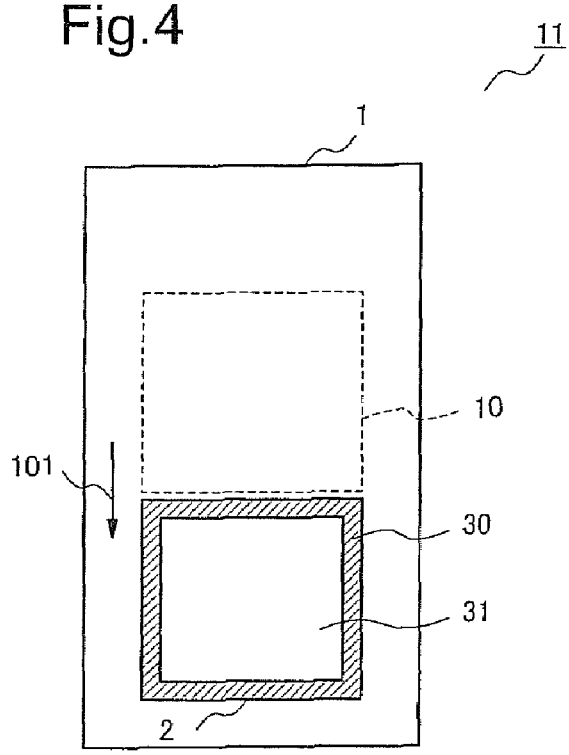
FIG. 4 is a plan view showing the opened state of the opening of the cleaning device for the fingerprint authentication apparatus.

As shown in FIG. 4, because the shutter 10 has opened the opening 2, the scan plate 31 is exposed. In this state, the authentication user's finger touches on the scan plate 31, and then the fingerprint authentication processing is performed. After fingerprint authentication processing is performed, by the shutter 10 moving to the moving direction 101, the opening 2 is closed.

Next, the fingerprint authentication apparatus 30 will be described with reference to FIG. 2 again. The fingerprint authentication apparatus 30 performs the fingerprint authentication of the authentication user by fingerprint authentication processing. That is, the fingerprint authentication apparatus 30 captures the fingerprint image of the authentication user by an image pickup unit (not shown).

Then, the fingerprint authentication apparatus 30 collates the captured fingerprint image and the fingerprint image previously stored in a fingerprint authentication server or the like. By this collation is completed, the fingerprint authentication processing of the authentication user is completed.

In this exemplary embodiment, the fingerprint authentication apparatus 30 installed in the chassis 1 includes a light source, an image pickup unit, an image data transmitter, a scan plate 31 and an authentication processor 32 mentioned later. The light source, the image pickup unit and the image data transmitter are not illustrated.

The fingerprint authentication processing is performed by the authentication processor 32 installed outside the chassis 1. As shown in FIG. 2, this authentication processor 32 is connected with the fingerprint authentication apparatus 30 electrically.

In this exemplary embodiment, the detailed description of the fingerprint authentication apparatus 30 will be omitted, since a configuration of the fingerprint authentication apparatus 30 is well known.

When a fingerprint authentication apparatus control signal (FAA control signal) to start authenticating processing is outputted from the authentication processor 32 to the fingerprint authentication apparatus 30, the fingerprint authentication apparatus 30 begins to capture the fingerprint image of the authentication user.

As mentioned above, the fingerprint authentication apparatus 30 have the scan plate 31. In order to perform the fingerprint authentication, the authentication user's finger touches on the scan plate 31. As a material of the scan plate 31, a transparent material such as glass can be also used.

By receiving reflected light from the finger touching the scan plate 31, the image pickup unit of the fingerprint authentication apparatus 30 captures the fingerprint image.

At that time, when the scan plate 31 is soiled with dust and sebum or the like, the fingerprint image cannot be captured correctly. That the correct fingerprint image cannot be captured means that the fingerprint authentication accuracy becomes low.

In this exemplary embodiment, the scan plate 31 of the fingerprint authentication apparatus 30 is cleaned mechanically.

In order to clean the scan plate 31, the fingerprint authentication apparatus 30 is provided in the chassis 1 so that it can move. The fingerprint authentication apparatus 30 is driven by the driving unit 70, and moves to a moving direction 102 and a moving direction 103 as shown in FIG. 2.

An operation of the fingerprint authentication apparatus 30 will be described with reference to FIG. 5 and FIG. 6.

Figure 5:
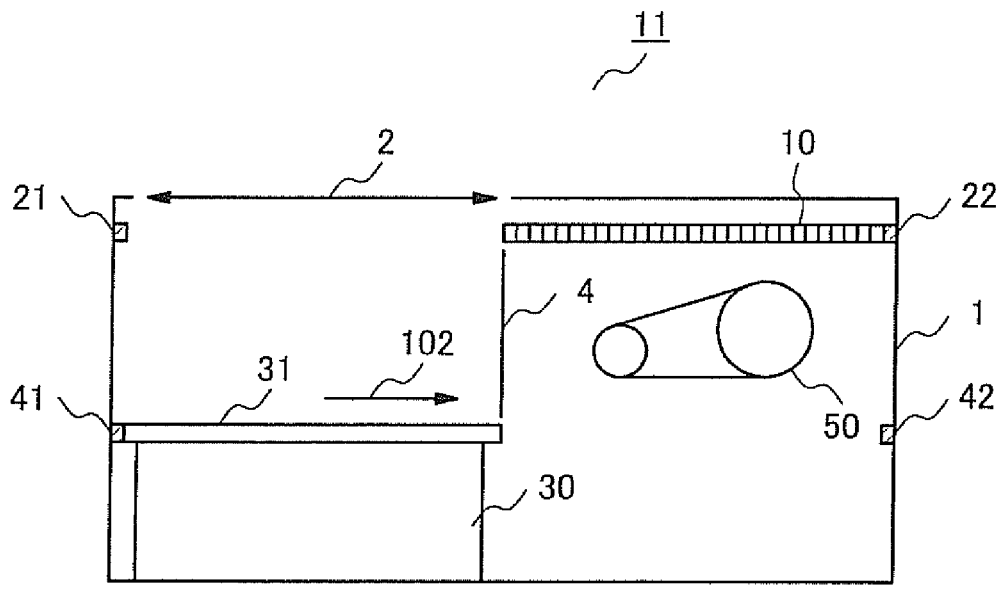
FIG. 5 is a side view showing the opened state of the opening of the cleaning device for the fingerprint authentication apparatus.

FIG. 5 is a side view of the cleaning device 11 for the fingerprint authentication apparatus 30, which indicates the position of the fingerprint authentication apparatus 30 in the state that the opening 2 is opened. In this state, the authentication user's finger touches on the scan plate 31.

At that time, the fingerprint authentication apparatus 30 is located at the opening 2 side so that the authentication user's finger can touch the scan plate 31. Hereinafter, this position is referred to as an authenticating position.

The fingerprint authentication apparatus 30 is driven in the moving direction 102 by the driving unit 70 shown in FIG. 2.

Figure 6:
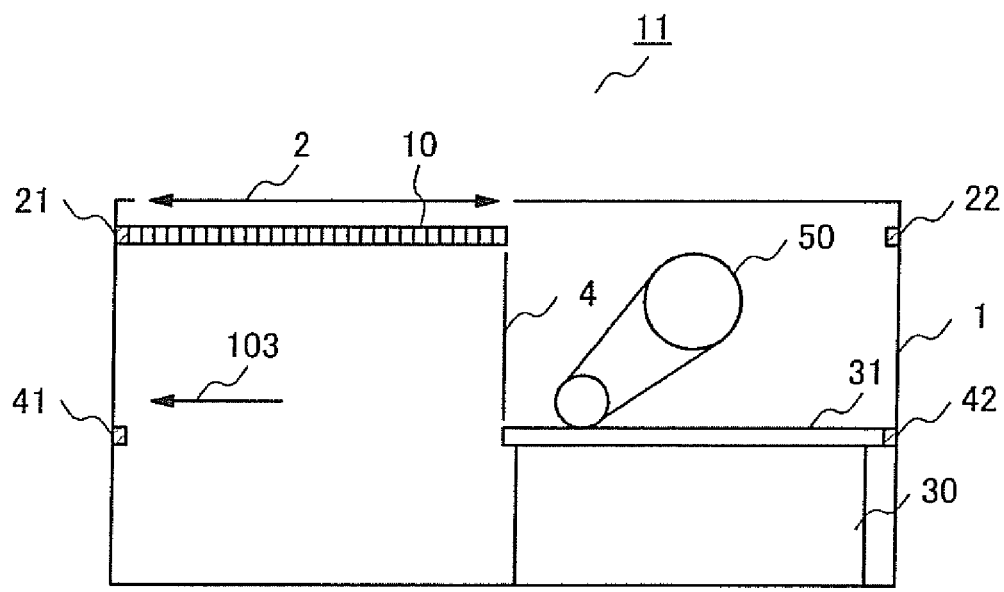
FIG. 6 is a side view showing the closed state of the opening of the cleaning device for the fingerprint authentication apparatus.

FIG. 6 is a side view of the cleaning device for the fingerprint authentication apparatus, which indicates the position of the fingerprint authentication apparatus 30 in the state that the opening 2 is closed. The scan plate 31 is cleaned, when the fingerprint authentication apparatus 30 moves from the state shown in FIG. 6 in the moving direction 103.

Further, in the state shown in FIG. 6, the fingerprint authentication apparatus 30 is located at the cleaner 50 side so that the cleaner 50 can clean the scan plate 31. Hereinafter, this position is referred to as a cleaning starting position.

The fingerprint authentication apparatus 30 moves to the cleaning starting position, after the shutter 10 closes the opening 2.

After that, the fingerprint authentication apparatus 30 moves in the direction of the moving direction 103 from the cleaning starting position. While the fingerprint authentication apparatus 30 moves in the moving direction 103, the contact state of the cleaner 50 and the scan plate 31 is kept. As a result, the scan plate 31 is cleaned.

By a rail (not shown) set up in the bottom of chassis 1, the fingerprint authentication apparatus 30 moves between the authenticating position and the cleaning starting position.

The moving direction of the fingerprint authentication apparatus 30 is not limited to the moving direction 102 and 103, if the position of the fingerprint authentication apparatus 30 at the time of authentication is the authenticating position under the opening 2, and the position of the fingerprint authentication apparatus 30 at the time to begin cleaning is the cleaning starting position.

Next, the operation of the cleaner 50 will be described with reference to FIG. 2 again. The cleaner 50 rotates a cleaning tape 51 to clean the surface of the scan plate 31. The cleaner 50 stands by at a position where the cleaning tape 51 does not touch the scan plate 31 when the position of the fingerprint authentication apparatus 30 is the authenticating position. Hereinafter, this position is referred to as a standby position.

The cleaner 50 moves until the cleaning tape 51 touches the surface of the scan plate 31, when the fingerprint authentication apparatus 30 has moved to the cleaning starting position. Hereinafter, this position is referred to as a contact position.

After the cleaner 50 has moved to the contact position, the fingerprint authentication apparatus 30 moves to the authenticating position while keeping this state. While the fingerprint authentication apparatus 30 is moving to the authenticating position from the cleaning starting position, the cleaner 50 cleans the scan plate 31 by rotating the cleaning tape 51. This cleaning tape 51 can be exchanged easily, because it is a cassette type.

Figure 7:
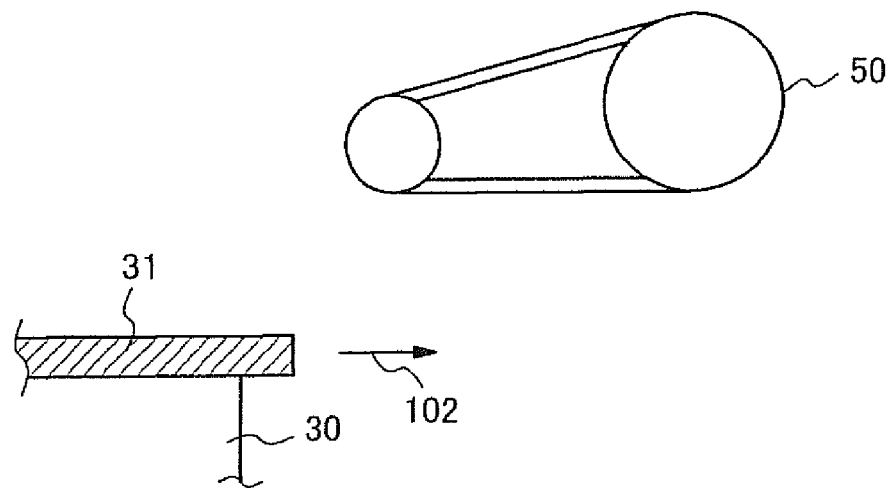
FIG. 7 is a partial side view of the cleaning device for the fingerprint authentication apparatus at the time of moving to a cleaning starting position.

A positional relationship between the cleaner 50 and the scan plate 31 will be described with reference to FIG. 7 and FIG. 8. FIG. 7 is a partial side view of the cleaning device for the fingerprint authentication apparatus 30, which indicates the state of the cleaner 50 when the position of the fingerprint authentication apparatus 30 is the authenticating position.

The cleaner 50 is located at the standby position when the position of the fingerprint authentication apparatus 30 is the position shown in FIG. 7. When the cleaner 50 is located at the standby position and the opening 2 is open, the authentication user's finger touches on the scan plate 31 to be performed fingerprint authentication. Then, when fingerprint authentication processing is completed, the fingerprint authentication apparatus 30 begins to move in the moving direction 102.

Figure 8:
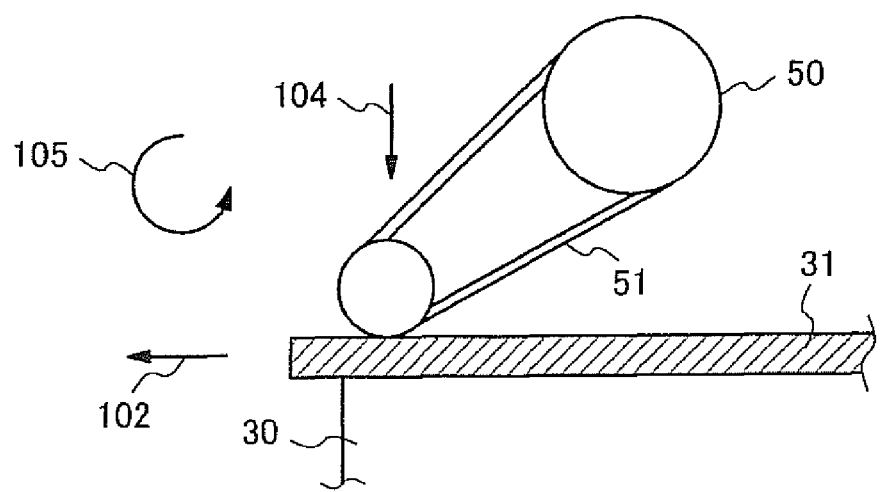
FIG. 8 is a partial side view showing the cleaning start state of the cleaning device for the fingerprint authentication apparatus.

FIG. 8 is a partial side view of the cleaning device for the fingerprint authentication apparatus 30, which indicates the state of the cleaner 50 when the fingerprint authentication apparatus 30 reaches the cleaning starting position. The authentication user cannot insert the finger in the opening 2, because the shutter 10 closes the opening 2 when it is in the state shown in FIG. 8.

The cleaner 50 moves in a moving direction 104, when the fingerprint authentication apparatus 30 reaches the cleaning starting position, Then, when the cleaning tape 51 reaches the contact position where it touches the scan plate 31, the fingerprint authentication apparatus 30 begins to move in the moving direction 103. At that time, the cleaning tape 51 revolves in the direction of a rotation direction 105. In the contact zone of the cleaning tape 51 and the scan plate 31, the rotation direction of the cleaning tape 51 is opposite to the moving direction of the fingerprint authentication apparatus 30.

By the cleaning tape 51 rubs the surface of the scan plate 31, it is cleaned. Such cleaning is performed until the fingerprint authentication apparatus 30 reaches the authenticating position from the cleaning starting position.

Further, the moving direction of the cleaner 50 is not limited to the moving direction 104, if the cleaner 50 touches the scan plate 31 in the contact position, and it separates from the scan plate 31 in standby position. Although the cleaner 50 moves between the contact position and the standby position by moving up and down in FIG. 8, the present invention is not limited to such configuration.

For example, the cleaner 50 can be made into the contact position if a spring which pushes the cleaning tape 51 against the scan plate 31 by elastic force is used. Then, this cleaning tape 51 is separated from the scan plate 31 by removing the force which pushes the cleaning tape 51 against the scan plate 31. As a result, the cleaner 50 is changed to the state of the standby position.

Thus, the states corresponding to the contact position and the standby position can be realized without moving the position of the cleaner 50.

Furthermore, in the state which fixed the position of the cleaner 50 in the contact position, a control which rotates or stops the cleaning tape 51 is possible. In this case, the cleaning of the scan plate 31 is performed while the cleaning tape 51 is rotating, and is not performed while the cleaning tape 51 is stopping.

Next, the driving unit 70 will be described with reference to FIG. 2 again. The driving unit 70 is supplied electric power from a power supply (not shown). And the driving unit 70 drives these by supplying electric power to the shutter 10, the fingerprint authentication apparatus 30, and the cleaner 50.

By driving the shutter 10, the driving unit 70 changes the opening 2 into the closed state or the opened state. The driving unit 70 moves the fingerprint authentication apparatus 30 between the authenticating position and the cleaning starting position, by driving the fingerprint authentication apparatus 30.

Furthermore, by driving the cleaner 50, the driving unit 70 moves this cleaner 50 between the standby position and the contact position. And when the cleaner 50 is in the contact position, the driving unit 70 rotates the cleaning tape 51.

In this exemplary embodiment, the fingerprint authentication apparatus 30 has a rack 71 (gear mechanism), and the driving unit 70 has a pinion 72 which engages with the rack 71. The driving unit 70 transmits the power to the pinion 72 via a belt (not shown) or the like for transmission of the power.

By this power, the fingerprint authentication apparatus 30 moves to the moving direction 102 or the moving direction 103. Also, the driving unit 70 drives the shutter 10, the cleaner 50 and the cleaning tape 51 by a power transmission mechanism such as a rack-and-pinion.

Further, as the power transmission mechanism, it is not limited to a system using the rack-and-pinion, because a power transmission mechanism such as a worm wheel (gear mechanism) can be applied. The installation position of the driving unit 70 is not limited to the underside position of the cleaner 50 as shown in FIG. 2.

Figure 9:
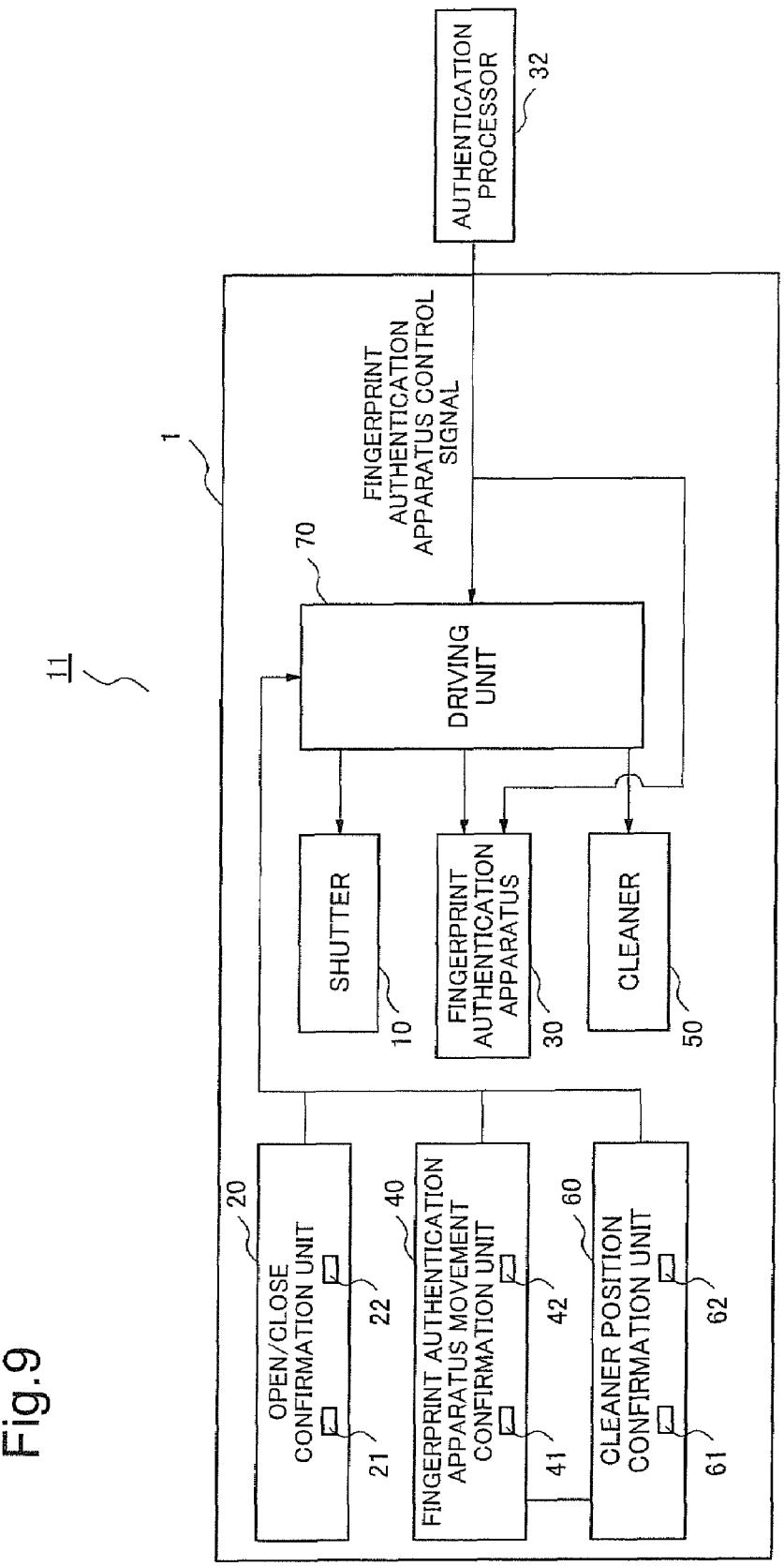
FIG. 9 is a block diagram showing a control function of a driving unit of the cleaning device for the fingerprint authentication apparatus.

This driving unit 70 drives and controls the shutter 10, the fingerprint authentication apparatus 30 and the cleaner 50. A control function of the driving unit 70 will be described with reference to FIG. 5, FIG. 6 and FIG. 9. FIG. 9 is a block diagram illustrating a control function of the driving unit 70.

The driving unit 70 further includes a shutter open/close confirmation unit 20, a fingerprint authentication apparatus movement confirmation unit 40 and a cleaner position confirmation unit 60. As mentioned above, the driving unit 70 supplies the power to the shutter 10, the fingerprint authentication apparatus 30 and the cleaner 50 to drive these.

When the FAA control signal outputted from outside of the chassis 1 to the fingerprint authentication apparatus 30 is received, the driving unit 70 begins cleaning control following this signal as a trigger signal to start the authenticating processing.

The driving unit 70 begins cleaning control following this signal as a trigger signal to start authenticating processing. When the FAA control signal is outputted to the fingerprint authentication apparatus 30 from outside of the chassis 1, the driving unit 70 begins the cleaning control as a trigger signal to start the authenticating processing.

By the way, the trigger for starting the authenticating processing of the driving unit 70 is not limited to the FAA control signal.

For example, when the authentication user presses an authenticating start button (not shown), the cleaning control may begin. The authenticating processing start trigger of the driving unit 70 can be substituted by a method other than above which can be assumed.

When the driving unit 70 begins cleaning control, the shutter 10, the fingerprint authentication apparatus 30 and the cleaner 50 are driven by a procedure mentioned later.

The shutter open/close confirmation unit 20 includes a detector 21 and a detector 22, and is connected with the driving unit 70 electrically.

By receiving a notification signal from the shutter open/close confirmation unit 20, the driving unit 70 detects completion of opening and closing of the shutter 10. At that time, the detector 21 outputs shutter close notification to the driving unit 70. The detector 22 outputs the shutter open notification to the driving unit 70.

As shown in FIG. 6, when the opening 2 is closed by the shutter 10, an edge of the shutter 10 pushes the detector 21. When the detector 21 is pushed, the shutter close notification is outputted from this detector 21 to the driving unit 70 as an electric signal, as shown in FIG. 9.

By receiving the shutter close notification from the detector 21, the driving unit 70 detects completion of closing of the opening 2 by shutter 10.

Similarly, as shown in FIG. 5, when the driving unit 70 opens the shutter 10, an edge of the shutter 10 pushes the detector 22. When the detector 22 is pushed, the shutter open notification is outputted from this detector 22 to the driving unit 70 as an electric signal.

By receiving the shutter open notification from the detector 22, the driving unit 70 detects completion of opening of the opening 2 by shutter 10.

Further, the method for driving unit 70 to detect completion of shutter opening and closing is not limited to the above-mentioned method.

For example, the driving unit 70 can detect completion of the shutter opening and closing based on a control information such as the number of rotations of the pinion and the power transmission time.

Thus, it is possible to substitute the method to detect completion of the shutter opening and closing by a method which a person skilled in the art can usually assume.

The fingerprint authentication apparatus movement confirmation unit 40 includes a detector 41 and a detector 42, and is connected with the driving unit 70 electrically.

The driving unit 70 detects completion of movement of the fingerprint authentication apparatus 30 by receiving a notification which is an electric signal from the fingerprint authentication apparatus movement confirmation unit 40. This detector 41 outputs the notification signal which indicates that the fingerprint authentication apparatus 30 moved to the authenticating position to driving unit 70.

On the other hand, the detector 42 outputs the notification signal which indicates that the fingerprint authentication apparatus 30 moved to the cleaning starting position to driving unit 70.

As shown in FIG. 5, when the fingerprint authentication apparatus 30 moves to the authenticating position, an edge of the scan plate 31 pushes the detector 41. When the detector 41 is pushed, this detector 41 outputs the notification signal which indicates that the fingerprint authentication apparatus 30 arrived at the authenticating position to driving unit 70.

By receiving this notification signal, the driving unit 70 detects that the fingerprint authentication apparatus 30 arrived at the authenticating position.

Similarly, as shown in FIG. 6, when the fingerprint authentication apparatus 30 moves to the cleaning starting position, an edge of the scan plate 31 pushes the detector 42. When the detector 42 is pushed, this detector 42 output a notification signal which indicates that the fingerprint authentication apparatus 30 arrived at the cleaning starting position to the driving unit 70.

By receiving this notification signal, the driving unit 70 detects that the fingerprint authentication apparatus 30 arrived at the cleaning starting position.

Meanwhile, based on a control information such as the number of rotations and a power transmission time of the pinion, the driving unit 70 can detect that the fingerprint authentication apparatus 30 arrived at the authenticating position and the cleaning starting position. The detection method of completion of the movement to these authenticating positions and cleaning starting positions can be substituted by a method which a person skilled in the art can usually assume.

The cleaner position confirmation unit 60 includes a detector 61 and a detector 62, and is connected with the driving unit 70 electrically.

By receiving a notification signal from the cleaner position confirmation unit 60, the driving unit 70 detects completion of movement of the cleaner 50.

The detector 61 outputs the notification signal which indicates that the fingerprint authentication apparatus 30 arrived at the standby position to driving unit 70.

The detector 62 outputs the notification signal which indicates that the fingerprint authentication apparatus 30 arrived at the contact position to driving unit 70.

If the cleaner 50 is driven to the standby position by the driving unit 70, a drive shaft (not shown) of the cleaner 50 pushes the detector 61. When the detector 61 is pushed, the detector 61 will output the notification signal which indicates that the cleaner 50 arrived at the standby position to the driving unit 70.

By receiving this notification signal, the driving unit 70 detects that cleaner 50 arrived at the standby position.

Similarly, if the cleaner 50 is driven to the contact position by the driving unit 70, the drive shaft of the cleaner 50 pushes the detector 62. When the detector 62 is pushed, the detector 62 will output the notification signal which indicates that the cleaner 50 arrived at the contact position to driving unit 70.

By receiving this notification signal, the driving unit 70 detects that the cleaner 50 arrived at the contact position.

Meanwhile, based on control information such as the number of rotations and a power transmission time of the pinion, the driving unit 70 can detect that the fingerprint authentication apparatus 30 arrived at the authenticating position and the cleaning starting position.

Thus, it is possible to substitute the method to detect completion of the clear 50 by a method which a person skilled in the art can usually assume.

Next, an operation method of the cleaning device for the fingerprint authentication apparatus in this exemplary embodiment will be described with reference to FIG. 5, FIG. 6 and FIG. 10. FIG. 10 show an operation flow of the cleaning device for the fingerprint authentication apparatus in this exemplary embodiment.

The driving unit 70 begins cleaning operation by receiving the FAA control signal for an authenticating processing start from the authentication processor 32 of the fingerprint authentication apparatus 30 (Step S10).

The driving unit 70 closes the opening 2 by driving the shutter 10 as shown in FIG. 6 (Step S20). When the opening 2 is in the closed state, the edge of the shutter 10 pushes the detector 21 of the shutter open/close confirmation unit 20. This detector 21 outputs the shutter close notification to the driving unit 70.

By receiving the shutter close notification from the detector 21, the driving unit 70 detects closure of the shutter 10 having been completed (Step S30).

Next, the driving unit 70 drives the fingerprint authentication apparatus 30 and moves this fingerprint authentication apparatus 30 to the cleaning starting position (Step S40). When the fingerprint authentication apparatus 30 moves to the cleaning starting position, the edge of the scan plate 31 pushes the detector 42 of the fingerprint authentication apparatus movement confirmation unit 40.

The detector 42 outputs the notification signal which indicates that the fingerprint authentication apparatus 30 arrived at the cleaning starting position to the driving unit 70.

By receiving the notification signal from detector 42, the driving unit 70 detects that the fingerprint authentication apparatus 30 arrived at the cleaning starting position (Step S50).

The driving unit 70 makes the cleaner 50 touch the scan plate 31 by moving the cleaner 50 to the contact position (Step S60). When the cleaner 50 touches the scan plate 31, the driving shaft of the cleaner 50 pushes the detector 62. The detector 62 outputs the notification signal which indicates that the cleaner 50 arrived at the contact position to the driving unit 70.

By receiving the notification signal from this detector 62, the driving unit 70 detects that the cleaner 50 moved to the contact position (Step S70).

The driving unit 70 drives the fingerprint authentication apparatus 30 and moves the fingerprint authentication apparatus 30 to the authenticating position from the cleaning starting position (Step S80). At the same time, by rotating the cleaning tape 51 of the cleaner 50 to the rotation direction 105 as shown in FIG. 8, the cleaner 50 begins to clean the scan plate 31.

When the fingerprint authentication apparatus 30 has moved to the authenticating position, the edge of the scan plate 31 pushes the detector 41 of the fingerprint authentication apparatus movement confirmation unit 40. The detector 41 outputs the notification signal which indicates that the fingerprint authentication apparatus 30 arrived at authenticating position to driving unit 70.

By receiving the notification signal from the detector 41, the driving unit 70 detects that the fingerprint authentication apparatus 30 moved to the authenticating position (Step S90). As a result, the driving unit 70 detects cleaning of the scan plate 31 has completed.

The driving unit 70 stops the rotation of the cleaning tape 51, when detecting cleaning having been completed (Step S100). The driving unit 70 separates the cleaner 50 from the scan plate 31 by moving the cleaner 50 to the standby position. When the cleaner 50 has moved to the standby position, the drive shaft of the cleaner 50 pushes the detector 61. The detector 61 outputs the notification signal which indicates that the cleaner 50 arrived at the standby position to the driving unit 70.

By receiving the notification signal from detector 61, the driving unit 70 detects that cleaner 50 moved to the standby position (Step S110).

The driving unit 70 drives the shutter 10 and opens this shutter 10 as shown in FIG. 5 (Step S120). When the shutter 10 is opened, the edge of the shutter 10 pushes the detector 22 of the shutter open/close confirmation unit 20. The detector 22 outputs the shutter open notification to the driving unit 70.

By receiving shutter open notification from the detector 22, the driving unit 70 detects opening of the shutter 10 having been completed (Step S130).

Further, after opening of the shutter 10 is completed, the driving unit 70 may output the notification of cleaning completion to the authentication processor 32 of the fingerprint authentication apparatus 30.

The above is a description of the operation method of the cleaning device for the fingerprint authentication apparatus in this exemplary embodiment. Further, the present invention is not limited to this exemplary embodiment. The composition of the present invention can be changed in various ways which a person skilled in the art can understand within the scope of the present invention. An example is explained as below.

In Step S90 of FIG. 10, when the notification signal from the detection part 41 which indicates that the cleaner 50 arrived at the authenticating position is received, the driving unit 70 detects the completion of cleaning of the scan plate 31.

However, after the fingerprint authentication apparatus 30 reaches the authenticating position, the completion of the cleaning is detectable when the driving unit 70 receives the signal from the authenticating processing apparatus 32.

That is, the driving unit 70 outputs the request signal of the check which inquires completion of cleaning to the authenticating processing apparatus 32, after moving the fingerprint authentication apparatus 30 to the authenticating position.

The authenticating processing apparatus 32 outputs the check start signal which executes the completion check of cleaning to the fingerprint authentication apparatus 30. The fingerprint authentication apparatus 30 executes the capture of the check image, when the check start signal is received. The capture action of the check image is the same as the capture action of the attestation user's fingerprint image. The authenticating processing apparatus 32 judges the completion check of cleaning based on the check image.

The method of judging the completion of cleaning can exemplify the following methods. The one method is the method of measuring the dispersion value of the brightness in the check image. And when the measured dispersion value is smaller than the predetermined threshold, it is judged as the completion of cleaning.

Other method is the methods of acquiring previously the image of scan plate 31 without the dirt or the like as an image for the completion judging. And the brightness of this image for the completion judging and the check image is compared.

If the compared value of brightness is smaller than the predetermined threshold, it is judged as the completion of cleaning. When it judges that cleaning completed the authenticating processing apparatus 32, the notification signal which indicates completion of cleaning will be outputted to the driving unit 70. The driving unit 70 detects that cleaning of the scan plate 31 has been completed by receiving the notification signal. Thus, completion of cleaning can be checked.

In this exemplary embodiment, the driving unit 70 controls the cleaner 50 so that it may perform cleaning while the fingerprint authentication apparatus 30 is moving to the authenticating position from the cleaning starting position.

However, the driving unit 70 may control the cleaner 50 so that it may perform cleaning while the fingerprint authentication apparatus 30 is moving from the authenticating position to the cleaning starting position. Also, the driving unit 70 may control the cleaner 50 so that it may perform cleaning continually while the fingerprint authentication apparatus 30 is going back and forth between the cleaning starting position and the authenticating position.

The cleaning tape 51 of the cleaner 50 may be controlled so that the direction of rotation may be changed according to the moving direction of the fingerprint authentication apparatus 30 driven by the driving unit 70.

It is also possible to prepare two cleaning tapes 51 for which the direction of rotation is different each other and use these two of cleaning tapes 51 appropriately according to the moving direction of the fingerprint authentication apparatus 30. If the solvents, such as the alcohol, are used together when cleaning, cleaning can be executed more efficiently.

In this exemplary embodiment, the driving unit 70 controls to perform cleaning while the fingerprint authentication apparatus 30 is moving.

However, the driving unit 70 can be controlled to clean by moving the cleaner 50, without moving the fingerprint authentication apparatus 30.

For example, the driving unit 70 can control the cleaner 50 so that the cleaner 50 rotates the cleaning tape 51 and moves on the scan plate 31 of the fingerprint authentication apparatus 30 located at the authenticating position.

Also in this case, the cleaning can be performed safely, because the shutter 10 is in the closed state.

In Step S20 of FIG. 10, driving unit 70 closed shutter 10, when starting cleaning operation. However, the driving unit 70 may control the shutter 10 which closes the opening 2 after the fingerprint authentication processing is completed, and cleans.

In this case, even if the cleaning is completed, the driving unit 70 controls the shutter 10 to keep up the state that the opening 2 closed. And when the next fingerprint authentication processing begins, the driving unit 70 controls the shutter 10 to open the opening 2. That is, the driving unit 70 performs the following control.

First, when the notification of fingerprint authentication completion is received from the authentication processor 32 of the fingerprint authentication apparatus 30, the driving unit 70 controls the shutter 10 so that the opening 2 may be closed. After the opening 2 is closed, the driving unit 70 makes the cleaner 50 begin cleaning operation. And even if the driving unit 70 confirms the completion of cleaning, it controls the shutter 10 to keep up the closed state of the opening 2.

In the closed state of opening 2, when the FAA control signal which indicates the fingerprint authentication start from the attestation processor 32 for the fingerprint authentication apparatus 30 is received, the driving unit 70 controls the shutter 10 to open the opening 2. And the fingerprint authentication apparatus 30 performs the capture of the fingerprint image, and performs the fingerprint authentication processing.

By such control, the scan plate 31 can be protected by the shutter 10 even during a waiting state in which fingerprint authentication processing is not performed. By such control, the shutter 10 protects the scan plate 31, when the fingerprint authentication processing is not executed.

The following effect is obtained by the cleaning device for the fingerprint authentication apparatus explained above. The scan plate 31 is cleaned at high speed and certainly, because the driving unit 70 controls and drives the shutter 10, the fingerprint authentication apparatus 30 and the cleaner 50.

The cleaning can be achieved safely, because the driving unit 70 performs control such that the scan plate 31 is cleaned in the state that the opening 2 is closed.

Further, the cleaner 50 can be exchanged easily, because the cleaner 50 can be attached and detached in a manner of a cassette system.

Accordingly, it can be applied to a usage state in which authenticating processing is performed for a large number of authentication users. Therefore, it can be adapted for the equipment with which a large number of authentication users perform the authenticating processing.

By the above, a cleaning device for the fingerprint authentication apparatus of the present invention can realize high-speed, reliable and safe cleaning.

Meanwhile, in Japanese Patent Application Laid-Open No. 1992-088586, a covering means exposes and covers the contact surface according to the motion of the finger. Because the cleaner is attached to the covering means, the cleaner rubs the contact surface according to the motion that the covering means exposes and covers. As a result, the contact surface is cleaned.

However, since the sebum which adheres on the contact surface contains the oil component, the cleaner cleaned according to reciprocating movement may fully be unable to remove sebum or the like.

Accordingly, the fingerprint authentication accuracy declines by the sebum or the like which remains on a contact surface, and it is insanitary because others' sebum or the like adheres to the surface.

However, according to this exemplary embodiment, because the scan plate is rubbed with the rotating cleaner and it cleans, sebum etc. uses the contact surface to remain clean.

Therefore, a decline of fingerprint authentication accuracy of the fingerprint authentication apparatus can be prevented, and the fingerprint authentication apparatus can be maintained sanitarily.

Next, the third exemplary embodiment of the present invention will be described. A cleaning device for a fingerprint authentication apparatus of the present invention includes a fingerprint authentication apparatus having a scan plate which the finger to be authenticated touches, a shutter which is installed to face the scan plate, and which covers the scan plate when it is in a closed state and exposes the scan plate when it is in an opened state, a cleaner to perform cleaning, a driving unit which makes the cleaner touch the scan plate to clean the scan plate when a shutter is in the closed state, and changes a shutter into the opened state when cleaning is completed.

At that time, the fingerprint authentication apparatus cleaning method includes; a step for changing a shutter, which is installed such that it faces the scan plate which the finger to be authenticated touches, and which is opened and shut such that it covers the scan plate when it is in the closed state and exposes the scan plate when it is in the opened state, into the closed state, a step for cleaning the scan plate by making the cleaner touch the scan plate, and a step for changing a shutter into the opened state after the cleaning has been completed.

As a result, it is possible to provide the cleaning device for the fingerprint authentication apparatus which can clean a scan plate which the finger to be authenticated touches at high speed, reliably and safely.

While the invention has been particularly shown and described with reference to exemplary embodiments thereof, the invention is not limited to these embodiments.

It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A fingerprint authentication apparatus cleaning device, comprising:
   a fingerprint authentication apparatus having a scan surface which a finger to be authenticated is made touch;
   a shutter which is installed in a manner facing said scan surface, and which opens and closes such that said shutter covers said scan surface in a closed state and exposes said scan surface in an opened state;
   a cleaner which performs cleaning; and
   a driving unit which, when said shutter is made be in an opened state, performs said cleaning of said scan surface by making said cleaner touch said scan surface, and, when said cleaning is completed, makes said shutter be in an opened state,
   wherein
   an installation position of said fingerprint authentication apparatus is movable; and
   said driving unit performs driving such that said driving unit moves an installation position of said fingerprint authentication apparatus, makes said cleaner touch said scan surface while moving said fingerprint authentication apparatus, and said cleaning of said scan surface is performed by rotating a cleaning tape of said cleaner in a reverse direction to a movement direction of said fingerprint authentication apparatus.

2. A fingerprint authentication apparatus cleaning device according to claim 1, wherein said driving unit is configured using a rack-and-pinion or a worm wheel.

3. A fingerprint authentication apparatus cleaning device according to claim 1, wherein said driving unit drives said shutter to make said shutter be in a closed state when being notified of starting of said authentication processing from said fingerprint authentication apparatus, and said driving unit drives said shutter to make said shutter be in an opened state when cleaning of said scan surface is completed.

4. A fingerprint authentication apparatus cleaning device according to claim 1, wherein said driving unit drives said shutter to make said shutter be in a closed state and holds said shutter in a closed state even after cleaning of said scan surface has been completed when being notified of completion of said authentication processing from said fingerprint authentication apparatus, and said driving unit drives said shutter to make said shutter be in an opened state when starting of said authentication processing is notified of from said fingerprint authentication apparatus.

5. A fingerprint authentication apparatus cleaning device according to claim 1, wherein said cleaner is a removable type and is exchangeable.

6. A fingerprint authentication apparatus cleaning method, comprising:
- a step of making a shutter, which is installed in a manner facing a scan surface that a finger to be authenticated is made touch and which opens and closes such that said shutter covers said scan surface in a closed state and exposes said scan surface in an opened state, be in a closed state;
- a step of performing said cleaning of said scan surface by making a cleaner touch said scan surface; and
- a step of making said shutter be in an opened state after said cleaning has been completed, wherein said step of performing said cleaning comprises:
- a step of moving an installation position of said fingerprint authentication apparatus;
- a step of making said cleaner touch said scan surface while moving said fingerprint authentication apparatus; and
- a step of performing said cleaning of said scan surface by rotating a cleaning tape of said cleaner in a reverse direction to a movement direction of said fingerprint authentication apparatus.

7. A fingerprint authentication apparatus cleaning method according to claim 6, wherein
said step of making said shutter which opens and closes be in an opened state comprises,
a step of making said shutter be in a closed state when starting of said authentication processing is notified of.

8. A fingerprint authentication apparatus cleaning method according to claim 6, wherein
said step of making said shutter which opens and closes be in a closed state comprises,
a step of making said shutter be in a closed state when completion of said authentication processing is notified of from said fingerprint authentication apparatus, and wherein
said step of making said shutter be in an opened state after said cleaning has been completed comprises:
- a step of holding said shutter in a closed state even after cleaning of said scan surface has been completed; and
- a step of making said shutter be in an opened state when starting of said authentication processing is notified of from said fingerprint authentication apparatus.

9. A fingerprint authentication apparatus cleaning method according to claim 6, further comprising
a step of replacing said cleaner by removing and attaching said cleaner.

* * * * *